April 14, 1964   J. A. HJÄLSTEN ETAL   3,128,836

PERCUSSION DRILL BIT

Filed April 23, 1962

United States Patent Office 3,128,836
Patented Apr. 14, 1964

3,128,836
PERCUSSION DRILL BIT
John Anders Hjälsten, Karl Einar Jernberg, and Curt Vilhelm Dahlin, Sandviken, Sweden, assignors to Sandvikens Jernverks Aktiebolag, Sandviken, Sweden, a corporation of Sweden
Filed Apr. 23, 1962, Ser. No. 189,499
3 Claims. (Cl. 175—408)

The present invention relates to a percussion drill bit, especially for drilling long holes, the front end of which is provided with one or more cutting inserts of cemented carbide fastened in a slot or slots in the drill bit, the rear end being provided with a threaded bore for fastening the drill bit to a drill rod or a drill bit adapter having a corresponding outer thread, the rear end also being provided with an outer flange for the guiding of the drill bit, said flange having a maximum extension in radial direction equal to the radial extension of the cutting portion.

In drilling long holes with drills having detachable drill bits of conventional kinds and with extension drill rods the penetration at first is comparatively satisfactory, but when the number of extension rods increases the penetration decreases remarkably. It has therefore for a long time been a desire to form the drill bits in such a way that a rapid penetration is achieved also when several extension rods are used in the drill. Another disadvantage with earlier long hole drills has been that they often have produced drill holes which deviate from the desired direction.

By the aid of the drill bits according to the invention, which should have a length at least two and a half times the maximum diameter of the bit at the cutting end, these and other problems have been solved, as these bits give a rapid penetration and straight drill holes even when several extension rods are coupled together in the drill. It has thus been found that the above mentioned favorable properties are achieved, if the threaded bore in the drill bit extends in axial direction at the most half of the total length of the drill bit. The flange should be situated on a cylindrical or in the main cylindrical portion of the periphery surface of the drill bit adjacent to its rear end. It has not yet been possible to give any certain explanation of the surprising fact that the drill bits according to the invention have a substantially more rapid penetration than earlier known bits for the said purpose.

Figure 1:
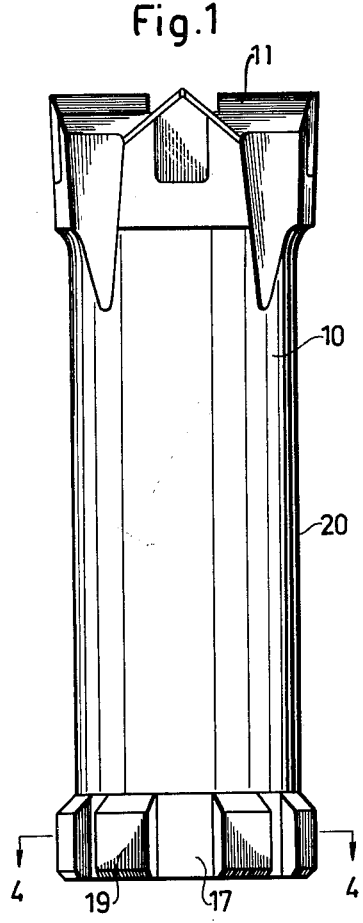
Figure 2:
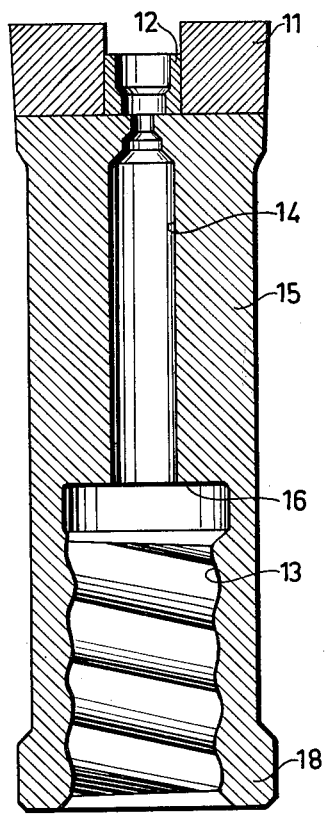
Figure 3:
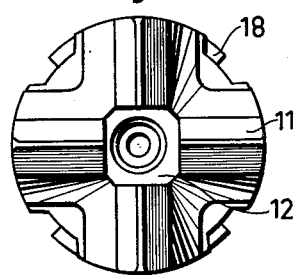
Figure 4:
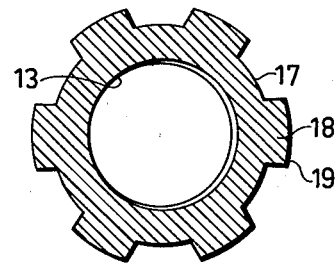

The invention will now be described in connection with the accompanying drawings in which FIG. 1 shows a side view of a drill bit according to the invention, FIG. 2 shows a longitudinal section of the same drill bit, FIG. 3 shows a plan view of the cutting end of the drill bit, and FIG. 4 is a section along the line 4—4 in FIG. 1.

The drill bit 10 is at its front end provided with four crosswise arranged cutting inserts 11 and a central part 12 supporting the inserts. The number of inserts can of course be varied from a single chisel insert to more than four inserts and the position of the inserts can also be varied. The inserts are made of cemented carbide by which is meant sintered products containing one or more hard carbides such as tungsten carbide and/or other hard substances together with one or more bonding metals such as cobalt.

The drill bit is intended to be applied to a drill rod or a drill bit adapter. For this purpose the rear end of the bit is provided with a threaded bore 13, for instance having round threads as shown. As mentioned the threaded bore should be comparatively short, at the most half of the total length of the drill bit, so that with the exception of the flushing channel 14 a longish solid portion 15 is situated between the bottom 16 of the bore and the cutting edge portion.

The drill bit 10 should have a length which is at least two and a half times the largest diameter at the cutting end. Preferably the length should be about three times and as a rule does not exceed four times the said diameter.

At the rear end of the drill bit, arranged around the peripheral surface 17 are a number, e.g. 4, 5, 6 or more lugs 18 protruding from said peripherical surface. The lugs are made short or comparatively short in the longitudinal direction of the bit. The grooves between the lugs, which may have a width about the same as the width of the lugs, are normally situated in the longitudinal direction of the bit but may in certain cases be helically arranged. The lugs constitute a flange the length of which in the axial direction of the drill bit may be from about $1/50$ to $1/2$ the length of the bit, preferably $1/20$ to $1/5$. $1/12$ of the length of the bit has been found practically suitable. If the flange is longer than $1/5$ of the bit the additional length does not substantially improve the guiding effect and an increase of the length to more than $1/2$ of the bit has no effect. A shorter flange than $1/50$ of the bit does not provide a sufficient wear surface.

The bore 13 should be sufficiently deep to provide a firm connection with the drill rod, and the depth of the bore should be larger than the diameter of the thread, preferably at least 1.5–2 times this diameter. The depth of the bore should preferably be larger than the length of the flange.

The solid portion 15 and the rear threaded part of the drill bit should in order to achieve the best possible effect be made in one piece as shown in the drawing.

In the embodiment illustrated the peripherical surface 20 of the drill bit between the flange portion and the cutting edge portion is in the main cylindrical, which has been found especially suitable. In radial direction the lugs 18 are limited by surfaces 19, which are situated in a cylinder with its axis coinciding with the drill axis. The periphery surface 17 between the lugs 18 has suitably a radius corresponding to the radius of the cylindrical surface 20, between the flange portion and the cutting edge portion.

The invention is of course not restricted to the shown and described embodiment but comprises any percussion drill bit within the scope of the following claims.

We claim:

1. A percussion drill bit comprising a body portion having a substantially cylindrical outer surface, a front end portion at one end of said body portion, said front end portion being provided with at least one cutting insert extending radially beyond said cylindrical outer surface, a plurality of spaced apart lugs arranged around said cylindrical surface adjacent to the rear end thereof, said lugs extending outwardly from said cylindrical surface a distance substantially equal to the radial extension of said cutting insert, the peripheral surfaces of said lugs lying in a cylindrical surface which is eccentric with said cylindrical surface of said body portion, the length of said lugs in the axial direction of said drill bit being within the range from $1/20$ to $1/2$ of the length of the drill bit, a threaded bore extending axially into said body portion from the rear end thereof to a distance greater than the diameter of said bore but not more than half the length of said body portion and terminating in a substantially plane surface perpendicular to the longitudinal axis of the drill bit, a flushing channel extending from said plane surface through said body portion to the front surface of said front end portion, said flushing channel having a substantially smaller diameter than said threaded bore thereby providing a substantial shoulder at the bottom of said threaded bore.

2. A percussion drill bit as defined in claim 1, in which the threaded bore extends axially into the body portion of the drill bit to a distance greater than the length of said lugs in the axial direction of the drill bit.

3. A percussion drill bit as defined in claim 1 in which the length of the drill bit is from 2½ to 4 times the maximum diameter of the drill bit.

References Cited in the file of this patent

UNITED STATES PATENTS

| | | |
|---|---|---|
| 1,540,619 | Hannan | June 2, 1925 |
| 1,669,360 | Towne | May 8, 1928 |
| 2,558,341 | Cory et al. | June 26, 1951 |
| 2,800,303 | Dick | July 23, 1957 |
| 2,821,364 | Godfrey | Jan. 28, 1958 |

UNITED STATES PATENT OFFICE
CERTIFICATE OF CORRECTION

Patent No. 3,128,836                          April 14, 1964

John Anders Hjälsten et al.

It is hereby certified that error appears in the above numbered patent requiring correction and that the said Letters Patent should read as corrected below.

Column 2, line 60, for "eccentric" read -- concentric --.

Signed and sealed this 28th day of July 1964.

(SEAL)

Attest:

ESTON G. JOHNSON
Attesting Officer

EDWARD J. BRENNER
Commissioner of Patents